United States Patent [19] [11] 4,234,468
Dalibor [45] Nov. 18, 1980

[54] COPOLYMER SOLUTION CONSISTING OF ACRYLIC RESIN, PROCESS FOR ITS MANUFACTURE AND THE USE THEREOF IN REACTIVE LACQUERS

[75] Inventor: Horst Dalibor, Norderstedt, Fed. Rep. of Germany

[73] Assignee: Hoechst Aktiengesellschaft, Fed. Rep. of Germany

[21] Appl. No.: 13,243

[22] Filed: Feb. 21, 1979

Related U.S. Application Data

[62] Division of Ser. No. 789,661, Apr. 21, 1977, Pat. No. 4,163,739.

[30] Foreign Application Priority Data

Apr. 29, 1976 [DE] Fed. Rep. of Germany ....... 2618809

[51] Int. Cl.$^3$ .................... C08F 4/38; C08F 8/30; C08K 5/00; C08K 5/04
[52] U.S. Cl. .................... 260/31.2 R; 260/31.4 R; 260/31.4 EP; 260/31.6; 260/32.8 R; 260/33.6 R; 260/33.6 UA; 260/33.4 R; 260/37 N; 525/27; 525/28; 525/111; 525/113; 525/123; 525/124; 525/125; 525/126; 525/194; 525/208; 526/228

[58] Field of Search ............... 260/31.2 R, 31.4 R, 260/31.4 EP, 31.6, 32.8 R, 33.6 R, 33.6 UA, 33.4 R, 37 N, 859 R; 526/228; 525/27, 28, 111, 123, 113, 126, 124, 125, 194, 208

[56] References Cited

U.S. PATENT DOCUMENTS 3,549,583  12/1970  Nagata et al. .................... 260/859

*Primary Examiner*—Joseph L. Schofer
*Assistant Examiner*—Herbert S. Lilling
*Attorney, Agent, or Firm*—Gordon W. Hueschen

[57] ABSTRACT

The present invention relates to a special copolymer solution consisting of acrylic resin containing 70 to 90% by weight of copolymer solids and 10 to 30% by weight of solvent. The invention also relates to a process for the manufacture of the copolymers which are present in the copolymer solution; additionally, the invention relates to the use of the copolymer solution for the manufacture of coating compositions for lacquer systems of low solvent content which contain polyisocyanates and which contain the copolymer manufactured according to the invention as a resin component which carries hydroxyl groups.

5 Claims, No Drawings

COPOLYMER SOLUTION CONSISTING OF ACRYLIC RESIN, PROCESS FOR ITS MANUFACTURE AND THE USE THEREOF IN REACTIVE LACQUERS

This is a division of application of Ser. No. 789,661, filed Apr. 21, 1977 now U.S. Pat. No. 4,163,739 Aug. 7, 1979.

BACKGROUND OF THE INVENTION (1) Field of the Invention

It is also an object of the present invention to provide a process for the manufacture of the copolymer solutions and their use as a binder component, the sheet-like structures which can be produced therefrom having, however, considerably improved properties in various respects. This includes the property that a lacquer which contains the new copolymer solutions in combination with organic polyisocyanates, when applied to a metallic substrate, after drying in the air for three to four days at temperatures of about 20° C., should cure in such a way that the film no longer swells under the action of water and also cannot be removed mechanically by scratching, even if the film is exposed for a brief period to water at temperatures of 50°–70° C.

It is also a further object of the present invention that the copolymer solutions of the invention, in combination with other copolymer solutions which are built up, as thermoplastic copolymers, from a basis of lower alkyl methacrylates and acrylic acid or methacrylic acid, should make it possible to manufacture coating agents which dry at room temperature, by physical means, by solvent evaporation, to give films which have outstanding properties.

It is a further aim of the present invention to provide an acrylic resin which contains hydroxyl groups and which, in combination with polyisocyanates, provides the binder basis for air-drying lacquers and stoving lacquers which are suitable for top lacquering in the automobile industry, the lacquer being present after stoving in layer thicknesses of about 40 to 80 $\mu$m and the top lacquer being located directly on top of the stoved primer of electrocoating lacquer.

In the modern methods of the present time for lacquering motor vehicles in an automobile factory, the coachwork parts are usually provided, after phosphating, with a primer of electrocoating lacquer and this is stoved to give a plastic coating. A spraying lacquer or a coating composition, which is generally designed a filler, is then applied to this plastic coating, usually by a spraying process, and stoving is carried out again.

The automobile lacquer formulation which contains pigment is then applied, in the desired pigmentation, to this two-layer coat of lacquer or primer by spraying and the automobile body is stoved again.

The whole coating, which, as explained above, consists of three layers, has a layer thickness after stoving of 70–100 $\mu$m, the fraction relating to the outer layer of top lacquer being 30 to 40 $\mu$m. In the course of rationalisation methods in the automobile industry efforts are being made to change over from the three-layer system to a two-layer build-up. In this, the electrocoat lacquering or another equivalent primer is intended to form the first coating layer and thereafter the final coat of lacquer is intended to be built up by means of the pigmented lacquer, but the total thickness of the layers applied is intended to have, in total, the same layer thickness. Using the conventional automobile top lacquers, however, it is not possible, in the customary spraying and stoving treatment, to produce, from lacquer formations containing pigment, coatings which, after drying in the air or after stoving, give lacquer films which are completely uniform (that is to say free from so-called curtaining and free from craters and blisters).

It is the aim of the present invention to provide an acrylic resin which contains hydroxyl groups and which, in combination with polyisocyanates, provides the binder basis for air-drying lacquers and stoving lacquers which are suitable for top lacquering in the automobile industry, the lacquer being present, after stoving, in layer thicknesses of about 40 to 80 $\mu$m and the top lacquer being located directly on top of the stoved primer of electrocoating lacquer. In addition, the copolymers according to the invention, and also the coating/binder combinations consisting of the copolymers according to the invention and the polyisocyanates, should be miscible and compatible with thermoplastic copolymers which are soluble in organic solvents. The use of the theromplastic copolymers makes possible rapid drying, especially when used as a repair lacquering in order to touch up defective coats of lacquer. In such cases tack-free drying at room temperature within 5 to 10 minutes is required and the desired resistance to premium-grade motor fuels is met by means of the new binder combinations after a drying time of only one hour.

A further particular advantage resides in the fact that, for example, it is also possible partially to touch up after final assembly a lacquered automobile body on which painting defects still need to be touched up, if the reactive lacquer applied consists of a binder combination of the copolymers manufactured according to the invention and polyisocyanates. The touching up can be carried out on the partially or completely cross-linked binder combinations. With the binder combinations which are envisaged as a touching-up lacquer and which consist of 20 to 80% by weight, preferably 40 to 60% by weight of copolymers manufactured according to the invention and 80 to 20% by weight, preferably 60 to 40% by weight of thermoplastic copolymers, no differences in colour shade are found between the partially or completely cross-linked reactive lacquer and the touching-up lacquer, provided that the same pigments are employed, in terms of quantity and type.

In addition, the copolymer solutions according to the invention, which have a lower viscosity, exhibit a better absorption of pigment both when using inorganic pigments, such as, for example, titanium dioxide, or when using organic pigments, such as, for example, carbon black. When titanium dioxide is used as the pigment, the copolymers manufactured according to the invention, and also the reactive lacquer manufactured therefrom, still give high-gloss films at a pigment/binder ratio of 1.5 to 2:1, while the known copolymers and the known reactive lacquers manufactured therefrom show a distinct falling-off in gloss at the same level of pigmentation. In addition, it has been found that the copolymers manufactured according to the invention and the reactive lacquers manufactured therefrom produce high-gloss lacquers with carbon black, while the known copolymers and the reactive lacquers manufactured therefrom exhibit matt films at the same level of pigmentation.

It is a further object of the invention to provide a process for the manufacture of soluble organic copolymers which are produced as a solution having a solids content of 70 to 90% by weight, the copolymer solutions which have been formulated ready for spraying having at 25° C. a viscosity of 25 seconds, measured in a DIN cup with a four mm flow orifice, and a solids conten of 40 to 65% by weight, preferably 45 to 65% by weight. The copolymer solutions manufactured according to the invention thus take account of the demands made by environmental protection for binders of high solids content and low solvent content.

The outstanding advantage of the copolymer solutions manufactured according to the invention resides in the fact that it is possible for the hydroxyl groups of the copolymers to crosslink with polyisocyanates at room temperature and also at elevated temperatures and to produce lacquers of high solids content, in a condition formulated ready for spraying, at a viscosity of 40 seconds, measured at 25° C. in a DIN cup having a four mm flow orifice, and at a solids content of 61 to 80% by weight, preferably 65 to 80% by weight in the clear lacquer.

(2) Prior Art

Numerous proposals have been disclosed to manufacture solvent-resistant and alkali-resistant lacquers by reacting polyisocyanates and copolymers containing hydroxyl groups and to convert them into coatings. DT-AS No. 1,247,006 describes a process for the manufacture by the polyisocyanate polyaddition process of alkali-resistant sheet-like structures which are obtained from polyisocyanates and copolymers containing hydroxyl groups, but which are not adequately water-resistant after a reaction time of three to four days at 20° C. These coatings obtained by this known process are, therefore, not suitable as top lacquers for external lacquerings which are resistant to weathering, since blistering takes place after a very short time and he adhesion of the lacquer to the various metallic substrates falls off and, as a result, the lacquer comes away from the substrate.

It is also known that polyhydroxyl compounds of polyols can be cured with polyisocyanates in order to obtain crosslinked lacquer coatings with good resistance properties. These combinations also exhibit too low a resistance to water and a lower resistance to weathering of the cured lacquer films.

French Pat. No. 1,556,309 describes a coating agent which contains solvent and, as the film-forming constituents, A. a copolymer consisting of (1) 2–50 parts by weight of an addition product with a 1:1 ratio of a carboxyl group of an α,β-ethylenically unsaturated acid and an epoxide group of a glycidyl ester of an aliphatic carboxylic acid having tertiary C atoms, in which the aliphatic tertiary group contains 4–26 C. atoms, an (2) 98–50 parts by weight of unsaturated, copolymerisable monomers, the total quantity of (1) and (2) adding up to 100 parts by weight, and B. at least one polyisocyanate which contains at least 2 isocyanate groups in its molecule, the polyisocyanate being present, relative to the copolymer, in a quantity of 0.2–5 equivalents relative to the hydroxyl groups of the copolymer.

As the Examples in this French Patent Specification show, copolymer solutions are obtained which have a solids content of only 48 to 52%. The content of hydroxyl groups in Examples 1 to 10 is 0.8 to 3.18% by weight in the known copolymers.

In Example 1=0.8% of hydroxyl groups
in Example 2=1% of hydroxyl groups
in Example 3=1.26% of hydroxyl groups
in Example 4=1.52% of hydroxyl groups
in Example 5=1.41% of hydroxyl groups
in Example 6=1.41% of hydroxyl groups
in Example 7=1.66% of hydroxyl groups
in Example 8=1.85% of hydroxyl groups
in Example 9=1.85% of hydroxyl groups
in Example 10=3.18% of hydroxyl groups.

If the procedure indicated in French Pat. No. 1,556,309 is then followed, the hydroxyl group content in the copolymers is increased, the viscosity is also increased. If the viscosity is reduced by dilution with xylene to 25 seconds at 25° C., measured in a DIN cup having a 4 mm flow orifice, the solids content of the copolymer solutions also decreases.

It cannot, however, be inferred from French Pat. No. 1,556,309 that it is possible, by selecting certain solvents and a certain range of quantities of a combination of various polymerisable monomers and using a combination of initiators, to manufacture copolymer solutions which have a substantially higher solids content and which open up the use of the new copolymers as binders for lacquer systems which are based on acrylates and have a low solvent content.

The particular advantage of the copolymer solutions manufactured according to the invention resides in the fact that the viscosity decreases when the hydroxyl group content in the copolymers is increased. When diluted with xylene to a viscosity of 25 seconds at 25° C., measured in a DIN cup having a 4 mm flow orifice, the solids content of the copolymer solutions manufactured according to the invention is then increased.

It has been found, surprisingly, that the copolymers which have been manufactured according to the invention and which have a hydroxyl group content of 3.5 to 6.5, preferably 4.5 to 5.5, %, lead to lower viscosities than do the known copolymers of the same hydroxyl group content. Thus, when dissolved to form a 70% strength by weight solution in ethylglycol acetate, the copolymer solutions manufactured according to the invention have viscosities of U to $Z_4$, preferably X to $Z_3$, measured on the Gardner-Holdt scale at 20° C. Proof of this statement is afforded by a comparison between the copolymer solution manufactured according to the invention in Example 1 and the known comparison copolymers 3 and 4. As 70% strength by weight solutions in ethylglycol acetate, the comparison copolymers 3 and 4 lead to higher viscosities which are higher than $Z_6$, measured on the Gardner-Holdt scale at 20° C.

Compared with the known copolymers, the copolymers manufactured according to the invention display the following advantages in the combination with polyisocyanates: better solvent-resistance, higher abrasion resistance and better resistance to weathering in the Florida climate. In addition, in the combination with polyisocyanates, the copolymers manufactured according to the invention produce lacquers of a higher solids content, having a solids content of 61 to 80% by weight, preferably of 65 to 80% by weight, in the clear lacquer, when diluted with acetone, xylene or butyl acetate to a viscosity of 40 seconds at 25° C., measured in a DIN cup having a 4 mm flow orifice. When such clear lacquers or pigmented lacquers are applied by spraying to steel sheets and are exposed to the air for a short time and subsequently stoved, high dry film layer thicknesses of 70 to 80 μm are obtained, which do not exhibit crater formation or blistering. The known lacquer combinations which are described in French Pat. No. 1,556,309, only produce a solids content of 10 to 60% by weight in the clear lacquer when diluted with acetone, butyl acetate or xylene to a viscosity of 40 seconds at 25° C. When such clear lacquers or pigmented lacquers are applied by spraying to steel sheets and are exposed to the air for a short time and subsequently stoved, lower dry film thicknesses of 40 to 50 μm are obtained, which in addition also exhibit crater formation and blistering.

SUMMARY

The subject of the invention is a copolymer solution consisting of (A) 10 to 30% by weight of inert organic solvents which are customary in the lacquer industry, and (B) 70 to 90% by weight of copolymers which have been manufactured by heating to 150° to 180° C., in the presence of mixtures of diacyl peroxides or peresters and alkyl hydroperoxides or dialkyl peroxides as the polymerisation initiators, a mixture of inert solvents having a boiling range of 150° to 180° C. and the component to be esterified, that is to say (a) 5–24% by weight of glycidyl esters of α-alkylalkanemonocarboxylic acids and/or α,α-dialkylalkanemonocarboxylic acids of the following empirical formula $C_{12-14}H_{20-26}O_3$, with the slow, uniform addition of (b) 12–30% by weight of hydroxyethyl acrylate and/or hydroxyethyl methacrylate, (c) 1–10% by weight of acrylic acid, ($d_1$) 20–50% by weight of styrene and ($d_2$) 5–35% by weight of methyl methacrylate, the components a, b, c, $d_1$ and $d_2$ having been employed in such quantities that their sum adds up to 100% by weight and the polymerisation and condensation reactions proceeding simultaneously and jointly and the additional condition applying that the components a, b and c have been employed in such quantities that the copolymers have a hydroxyl group content of 3.5 to 6.5% by weight, it being necessary that the components A and B add up to 100% by weight.

The copolymers first mentioned are characterised in that a 70% strength by weight solution of copolymer in ethylglycol acetate has a viscosity, measured at 25° C., of U to $Z_4$ on the Gardner-Holdt scale and a solution formulated with xylene to a viscosity of 25 seconds at 25° C., with a DIN cup having a 4 mm flow orifice, has a solids content of 40 to 65% by weight. The preferred embodiment of the copolymer solution is characterised in that a 70% strength by weight solution of copolymer in ethylglycol acetate has a viscosity, measured at 25° C., of X to $Z_3$ on the Gardner-Holdt scale and a solution formulated with xylene to a viscosity of 25 seconds at 25° C., with a DIN cup having a 4 mm flow orifice, has a solids content of 45 to 65% by weight.

A special embodiment of the copolymer solution is characterised in that a 70% strength by weight solution of the copolymer in ethylglycol acetate has a viscosity, measured at 25° C., of $Z_2$ to $Z_3$ on the Gardner-Holdt scale, and a solution formulated with xylene to a viscosity of 25 seconds at 25° C., measured by means of a DIN cup having a 4 mm flow orifice, has a solids content of 47% by weight.

A preferred embodiment of the copolymer solution is characterised in that it consists of (A) 20 to 25% by weight of inert organic solvents which are customary in the lacquer industry, and (B) 75 to 80% by weight of copolymers which have been manufactured by heating to 150° to 180° C., in the presence of mixtures of tert.-butyl perbenzoate and cumene hydroperoxide as the polymerisation initiators, a mixture of inert solvents having a boiling range of 150° to 180° C. and the components to be esterified, that is to say (a) 11–12% by weight of glycidyl esters of α-alkylalkanemonocarboxylic acids and/or α,α-dialkylalkanemonocarboxylic acids of the following empirical formula $C_{12-14}H_{20-26}O_3$, with the slow, uniform addition of (b) 25–26% by weight of hydroxyethyl acrylate and/or hydroxyethyl methacrylate, (c) 3–4% by weight of acrylic acid, ($d_1$) 44–48% by weight of styrene and ($d_2$) 10–16% by weight of methyl methacrylate, the components a, b, c, $d_1$ and $d_2$ having been employed in such quantities that their sum adds up to 100% by weight and the polymerisation and condensation reactions proceeding simultaneously and jointly and the additional condition applying that the components a, b and c have been employed in such quantities that the copolymers have a hydroxyl group content of 4.5±0.3% by weight, it being necessary that the components A and B add up to 100% by weight.

A further subject of the invention is a process for the manufacture, in organic solvents, of copolymers which are soluble in organic solvents by copolymerisation of alkyl acrylates, hydroxyalkyl acrylates, styrene and an α,β-unsaturated carboxylic acid with simultaneous esterification by glycidyl esters of α-alkylalkanemonocarboxylic acids and/or α,α-dialkylalkanemonocarboxylic acids, by heating in the presence of polymerisation initiators, characterised in that a mixture consisting of (A) 10 to 30% by weight of inert organic solvents which are customary in the lacquer industry and (B) 90 to 70% by weight of a reaction mixture consisting of the components a, b, c, $d_1$ and $d_2$ is reacted, the inert organic solvent and the components to be esterified, that is to say (a) 5–24% by weight of glycidyl esters of α-alkylalkanemonocarboxylic acids and/or α,α-dialkylalkanemonocarboxylic acids of the following empirical formula $C_{12-14}H_{20-26}O_3$ (+), being heated to 165° to 180° C. and a mixture consisting of (b) 12–30% by weight of hydroxyethyl acrylate and/or hydroxyethyl methacrylate, (c) 1–10% by weight of acrylic acid, ($d_1$) 20–50% by weight of styrene and ($d_2$) 5–35% by weight of methyl methacrylate, the components a, b, c, $d_1$ and $d_2$ being employed in such quantities that their sum adds up to 100% by weight, being added slowly and uniformly, in the presence of mixtures of diacyl peroxides or peresters and alkyl hydroperoxides or dialkyl peroxides as the polymerisation initiators, and, in the course thereof, the temperature being kept between 165° C. at the start and 180° C. at the end, until the solids content of the solution has reached the theoretical value of between 70 and 80% by weight, the polymerisation and condensation reactions proceeding simultaneously and jointly and the additional condition applying that the components a, b and c are employed in such quantities that the copolymers have a hydroxyl group content of 3.5 to 6.5% by weight.

(+) Preferably a mixture of glycidyl esters of α,α-dialkylalkanemonocarboxylic acids having a minor content (up to about 10% by weight of the mixture) of glycidyl esters of α-alkylalkanemonocarboxylic acids of the said empirical formula, the mixtuure having an epoxide equivalent of 240 to 250.

A preferred embodiment of the process is characterised in that a mixture consisting of (A) 10 to 25% by weight of ethylglycol acetate and (B) 90 to 75% by weight of a reaction mixture consisting of the components a to $d_2$ is reacted, the component to be esterified, that is to say (a) 10–24% by weight of glycidyl esters of α-alkylalkanemonocarboxylic acids and/or α,α-dialkylalkanemonocarboxylic acids of the following empirical formula $C_{12-14}H_{20-26}O_3$ (+), being heated with the ethylglycol acetate to 165° to 180° C. and a mixture consisting of (b) 18–26% by weight of hydroxyethyl acrylate and/or hydroxyethyl methacrylate, (c) 2–9% by weight of acrylic acid, ($d_1$) 20–50% by weight of styrene, ($d_2$) 10–35% by weight of methyl methacrylate, (e) 1–3.5% by weight of dibenzoyl peroxide or tert.-butyl peroctoate or tert.-butyl perbenzoate and (e') 1–3% by weight of cumene hydroperoxide or di-tert.-butyl peroxide, the components a, b, c, $d_1$ and $d_2$ being employed in such quantities that their sum adds up to 100% by weight, being added slowly and uniformly and, in the course thereof, the temperature being kept between 165° C. at the start and 175° C. at the end, until the solids content of the solution has reached the theoretical value of between 75 and 90% by weight, the polymerisation and condensation reactions proceeding jointly and simultaneously and the additional condition applying that the components a, b and c are employed in such quantities that the copolymers have a hydroxyl group content of 4 to 5.5% by weight.
(+)Already explained in the preceding text The most preferred embodiment of the invention relates to a process in which a mixture consisting of (A) 15–25% by weight of ethylglycol acetate and (B) 85–75% by weight of a reaction mixture consisting of the components a to $d_2$ is reacted, the component to be esterified, that is to say (a) 10–24% by weight of glycidyl esters of α,α-dialkylalkanemonocarboxylic acids of the following empirical formula $C_{13}H_{24}O_3$ (+) which have been obtained by reacting propylene trimer, carbon monoxide and water and consist almost exclusively of monocarboxylic acids having highly branched $C_{10}$ chains, being heated with the ethylglycol acetate to 165° to 175° C. and a mixture consisting of (b) 18–26% by weight of hydroxyethyl acrylate and/or hydroxyethyl methacrylate, (c) 2–9% by weight of acrylic acid, ($d_1$) 20–50% by weight of styrene, ($d_2$) 10–35% by weight of methyl methacrylate, (e) 1–3% by weight of tert.-butyl perbenzoate and (e') 1–2.5% by weight of cumene hydroperoxide, dissolved to form an 80% strength solution in a mixture of alcohols, ketones and cumene, it being necessary that the sum of the monomers a to $d_2$ adds up to 100% by weight, being added slowly and uniformly in the course of 6 to 10 hours and, in the course thereof, the temperature being kept at 170°±5° C., until the solids content of the solution has reached the theoretical value of between 75 and 85% by weight, the polymerisation and condensation reactions proceeding jointly and simultaneously and the copolymers having a hydroxyl group content of 4 to 5.5% by weight.
(+)Already explained in the preceding text.

A preferred embodiment of the process of the invention is characterised in that a mixture consisting of (A) 20 to 25% by weight of inert organic solvents which are customary in the lacquer industry and (B) 75 to 80% by weight of a reaction mixture consisting of the components a, b, c, $d_1$ and $d_2$ is reacted, the inert organic solvent and the components to be esterified, that is to say (a) 11–12% by weight of glycidyl esters of αalkylalkanemonocarboxylic acids and/or α,α-dialkylalkanemonocarboxylic acids of the following empirical formula $C_{12-14}H_{20-26}O_3$ (+), being heated to 165° to 180° C. and a mixture consisting of (b) 25–26% by weight of hydroxyethyl acrylate and/or hydroxyethyl methacrylate, (c) 3–4% by weight of acrylic acid, ($d_1$) 44–48% by weight of styrene and ($d_2$) 10–16% by weight of methyl methacrylate, the components a, b, c, $d_1$ and $d_2$ being employed in such quantities that their sum adds up to 100% by weight, being added slowly and uniformly, in the presence of mixtures of tert.-butyl perbenzoate and cumene hydroperoxide as the polymerisation initiators, and, in the course thereof, the temperature being kept between 165° C. at the start and 180° C. at the end, until the solids content of the solution has reached the value of 80±1% by weight, the polymerisation and condensation reactants proceeding simultaneously and jointly, so that the copolymers have a hydroxyl group content of 4.5±0.3% by weight.
(+)Already explained in the preceding text.

A further preferred embodiment of the process of the invention is characterised in that a mixture consisting of (A) 20–25% by weight of ethylglycol acetate and (B) 75–80% by weight of a reaction mixture of the components a to $d_2$ is reacted, the component to be esterified, that is to say (a) 11–12% by weight of glycidyl esters of α,α-dialkylalkanemonocarboxylic acids of the following empirical formula $C_{13}H_{24}O_3$ (+) which have been obtained by reacting propylene trimer, carbon monoxide and water and consist almost exclusively of monocarboxylic acids having highly branched $C_{10}$ chains, being heated with the ethylglycol acetate to 165° to 170° C. and a mixture consisting of (b) 25–26% by weight of hydroxyethyl acrylate and/or hydroxyethyl methacrylate, (c) 3–4% by weight of acrylic acid, ($d_1$) 44–48% by weight of styrene, ($d_2$) 10–16% by weight of methyl methacrylate, (e) 2–2.5% by weight of tert.-butyl perbenzoate and (e') 1–5% by weight of cumene hydroperoxide, dissolved to form an 80% strength solution in a mixture of alcohols, ketones and cumene, it being necessary that the sum of the monomers a to $d_2$ adds up to 100% by weight, being added slowly and uniformly in the course of 6 to 10 hours and, in the course thereof, the temperature being kept at 170°–±5° C., until the solids content of the solution has reached a value of 80±1% by weight, the polymerisation and condensation reactions proceeding jointly and simultaneously and the copolymers having a hydroxyl group content of 4.5±0.3% by weight.
(+) Already explained in preceeding text The invention also relates to the use of the new copolymers for the manufacture of reactive lacquers.

When the new copolymers are used in reactive lacquers, the components A' and B' are preferably used in the following quantities: (A') 60–80% by weight of copolymers which contain hydroxyl groups and have been manufactured according to the invention and (B') 20–40% by weight of an organic polyisocyanate, it being necessary that (A') and (B') together add up to numerical values of 100% by weight.

A particularly preferred embodiment of the use comprises: (A') 63–68% by weight of copolymers which contain hydroxyl groups and have been manufactured according to the invention and (B') 32–37% by weight of an organic triisocyanate which has been obtained by reacting 3 mols of hexamethylene diisocyanate and 1 mol of water, it being necessary that A' and B' add up to numerical values of 100% by weight.

In a further use of the new copolymers in coating agents which dry by physical means in the air, these copolymers are employed in quantities of (A') 20–80% by weight of copolymers which contain hydroxyl groups and have been manufactured according to the invention and (B'') 80–20% by weight of a thermoplastic copolymer manufactured from 98–99.5% by weight of methyl methacrylate and/or ethyl methacrylate and 0.5–2% by weight of methacrylic acid or acrylic acid, it being necessary that the components add up to 100% by weight.

The thermoplastic copolymers (B") are manufactured by dissolving the monomers in aromatic solvents, such as, for example, benzene, toluene or xylene, and heating the mixture to a temperature of 60° to 120° C., preferably 80° to 100° C., and adding the polymerisation initiator, for example dibenzoyl peroxide or tert.-butyl peroctoate or tert.-butyl perbenzoate, preferably dissolved in aromatic solvents, to the mixture of monomers in the course of about 1 to 5 hours, preferably 2 to 4 hours, and carrying out polymerisation at 80° to 100° C. Polymerisation is carried out here to give a solids content of 40 to 55% by weight. The proportion of peroxide is 0.4 to 1% by weight, relative to the mixtures of monomers employed. The thermoplastic copolymers, which are present, dissolved in toluene or mixtures of xylene and n-butanol, as 40% strength by weight solutions, have viscosities of W–$Z_5$ at 25° C. on the Gardner-Holdt scale.

Surprisingly, the copolymers manufactured according to the invention also provide the good compatibility with thermoplastic copolymers which is required. On the other hand, the known copolymer solutions exhibit no compatibility with thermoplastic copolymers. The particular advantage of the compatibility of the copolymer solution (A'), manufactured according to the invention, with the thermoplastic copolymers (B") resides in the fact that it is possible to touch up blemishes in a finished coat of lacquer after final assembly of, for example, a finished automobile body, it being intended that the coating agent according to the invention, which consists of the copolymers manufactured according to the invention and polyisocyanates, should be overlacquered. When binder combinations consisting of 20 to 80% by weight, preferably 40 to 60% by weight, of copolymer manufactured according to the invention and 80 to 20% by weight, preferably 60 to 40% by weight, of a thermoplastic copolymer are used, outstandingly rapid and tack-free drying results within 5 to 10 minutes at approx. 20° C. After a drying time of a further hour at 20° C., coats of lacquer with a hard surface are obtained which are resistant to premium grade motor fuels.

The organic solvents which are customary in the lacquer industry, such as, for example, acetone, methyl ethyl ketone, methyl isobutyl ketone or cyclohexanone, ethyl acetate, butyl acetate, glycol monomethyl ether-acetate, glycol monoethyl ether-acetate, glycol monobutyl ether-acetate, acetoacetic acid methyl ester, acetoacetic acid ethyl ester, acetoacetic acid butyl ester, benzene, toluene, xylene and/or aromatic solvent mixtures having a boiling range of 150° to 200° C., are used, individually or as mixtures, as the component A.

Organic solvents, individually or as mixtures, which have a boiling range of 150° to 200° C. are preferred. These include, for example, ethylglycol acetate, acetoacetic acid methyl ester, acetoacetic acid ethyl ester and aromatic solvent mixtures having a boiling range of 150° to 180° C. Ethylglycol acetate is particularly suitable in the manufacture of the copolymers according to the invention. It can be removed, partly or wholly, by distillation and can be replaced by low-boiling solvents which have a better solubility for the copolymers according to the invention. Acetone, methyl ethyl ketone, methyl isobutyl ketone, ethyl acetate and butyl acetate are particularly suitable for this purpose.

5 to 24, preferably 10 to 24, % by weight of glycidyl esters of α-alkylalkanemonocarboxylic acids and/or α,α-dialkylalkanemonocarboxylic acids of the following empirical formula $C_{12-14}H_{20-26}O_3$ are used, individually or as mixtures, as the component a. The emperical formula $C_3H_5O$ applies to the glycidyl radical in the glycidyl esters of the α-alkylalkanemonocarboxylic acids and/or α,α-dialkylalkanemonocarboxylic acids. The mixtures of α-alkylalkanoic acids and α,α-dialkylalkanoic acids represent monocarboxylic acids which contain a $C_9$, $C_{10}$ and $C_{11}$ chain. The manufacturing processes for the manufacture of the α-alkylalkanemonocarboxylic acids mentioned in the preceding text are based on the pioneering work of Dr. H. Koch of the Max-Planck-Institut für Kohlenforschung in Mühlheim, Federal Republic of Germany. The acids are completely saturated and are very highly substituted on the carbon atom in the α-position. Acids which have two hydrogen atoms on the α-carbon atoms are not present and only 6–7% of these acids contain a hydrogen atom. Cyclic material is also present (Deutsche Farben Zeitschrift, No. 10, Year 16, page 435). It is preferable to employ α-alkylalkanemonocarboxylic acids and/or α,α-dialkylalkanemonocarboxylic acids which have been obtained by reacting propylene trimer, carbon monoxide and water and which consist almost exclusively of monocarboxylic acids having highly branched $C_{10}$ chains. The empirical formula of the glycidyl ester compound is $C_{13}H_{24}O_3$.

12 to 30% by weight of hydroxyethyl acrylate and/or hydroxyethyl methacrylate are employed as the component b. Hydroxyethyl acrylate imparts high elasticity to the copolymers. This is particularly required in cases where the metal substrates are shaped by an impact process. A further outstanding property of hydroxyethyl acrylate in the copolymers according to the invention consists in promoting the wetting of the pigment, especially in the case of organic pigments and carbon black. Hydroxymethyl methacrylate imparts to the copolymers according to the invention a particularly high film hardness, which is particularly required when formulating polyisocyanate reactive clear lacquers in two-coat metal effect lacquering.

18 to 26% by weight of hydroxyethyl acrylate are used particularly preferentially as the component b, since particularly low viscosities lead to a high solids content in the condition ready for spraying.

1 to 10% by weight of acrylic acid, preferably 2 to 9% by weight of acrylic acid, are employed as the component c.

20 to 50% by weight of styrene, which gives second order transition temperatures of about 100° C. as a homopolymer and can thus be regarded as a so-called hard monomer which imparts the desired film hardness to the copolymers according to the invention, are employed as the component $d_1$.

5 to 30% by weight of methyl methacrylate, preferably 10 to 35% by weight, are employed as the component $d_2$. As a copolymerisation component, methyl methacrylate imparts to the copolymers according to the invention a particularly high resistance to weathering, especially in weathering tests in the Florida climate.

Peroxide mixtures consisting of at least two peroxides are used as the polymerisation initiators in the manufacture of the copolymers according to the invention. The peroxide mixtures have various chemical compositions. Peroxides of the first group e are represented by diacyl peroxides, such as dibenzoyl peroxide, or peresters, such as tert.-butyl perbenzoate, tert.-butyl peroctoate or tert.-butyl perisononanate. Peroxides of the second group e' are represented by alkyl hydroperoxides, such as tert.-butyl hydroperoxide and cumene hydroperoxide, or dialkyl peroxides, such as di-tert.-butyl peroxide or dicumyl peroxide. The peroxide mixtures used are in each case 1 to 3.5% by weight of a peroxide from the first group e and 1 to 3% by weight of a peroxide from the second group, relative to 100% by weight of the components a, b, c, $d_1$ and $d_2$.

The following combinations of peroxides from groups one and two are employed: dibenzoyl peroxide/tert.-butyl hydroperoxide; dibenzoyl peroxide/cumene hydroperoxide; dibenzoyl peroxide/dicumyl peroxide; tert.-butyl perbenzoate/butyl hydroperoxide; tert.-butyl perbenzoate/cumene hydroperoxide; tert.-butyl perbenzoate/di-tert.-butyl peroxide; tert.-butyl perbenzoate/dicumyl peroxide; tert.-butyl peroctoate/tert.-butyl hydroperoxide; tert.-butyl peroctoate/cumene hydroperoxide; tert.-butyl peroctoate/di-tert.-butyl peroxide; tert.-butyl peroctoate/dicumyl peroxide; tert.-butyl perisononanate/tert.-butyl hydroperoxide; tert.-butyl perisononanate/cumyl hydroperoxide; tert.-butyl perisononanate/di-tert.-butyl peroxide; or tert.-butyl perisononanate/dicumyl peroxide.

The following combinations of peroxides are included in the preferred embodiment: dibenzoyl peroxide/cumene hydroperoxide; dibenzoyl peroxide/di-tert.-butyl peroxide; tert.-butyl peroctoate/cumene hydroperoxide; tert.-butyl peroctoate/di-tert.-butyl peroxide; tert.-butyl perbenzoate/cumene hydroperoxide; and tert.-butyl perbenzoate/di-tert.-butyl peroxide. Peroxide mixtures which contain, relative to 100% by weight of the components a, b, c, $d_1$ and $d_2$, the component e having 1.5 to 2.5% by weight of tert.-butyl perbenzoate and e' having 1 to 2.5% by weight of cumene hydroperoxide, dissolved to form an 80% strength solution in a mixture of alcohols, ketones and cumene, are the most preferred embodiment. It is found, surprisingly, that, in the most preferred embodiment of the peroxide mixtures and in the most preferred embodiment of the copolymer solution, 75 to 85% strength by weight copolymer solutions in ethylglycol acetate are obtained which display a viscosity of 25° C. of X–$Z_3$ on the Gardner-Holdt scale as a 70% strength by weight solution in ethylglycol acetate, and display a solids content of 45 to 65% by weight when an 80% strength by weight solution in ethylglycol acetate is diluted with xylene to a viscosity of 25 seconds, measured at 25° C. in a DIN cup having a 4 mm flow orifice.

The peroxide mixtures are generally dissolved in the monomers or are added separately to the polymerisation medium, the solvent or the solvent mixtures. In some cases it is also possible to dissolve small proportions of the peroxide mixtures, up to 20% by weight of the quantity of peroxides employed, in the solvent or the solvent mixtures and to add uniformly the residual quantity of the peroxide mixtures, separately from the monomers or dissolved in the latter, to the polymerisation medium, solvent or solvent mixture. It proves particularly suitable to dissolve the tert.-butyl perbenzoate of the peroxide mixtures in the monomers and to add uniformly the mixtures which have been prepared, with a time of 6 to 10 hours, to the polymerisation and condensation medium consisting of the solvent or solvent mixture and the glycidyl esters of α-alkylalkanemonocarboxylic acids and/or α,α-dialkylalkanemonocarboxylic acids. The optimum lowering of viscosity, which leads to the copolymers according to the invention, is achieved by this means. The reaction of the acrylic acid with the glycidyl esters of α,α-dialkylalkanemonocarboxylic acids proceeds approximately according to the following formula:

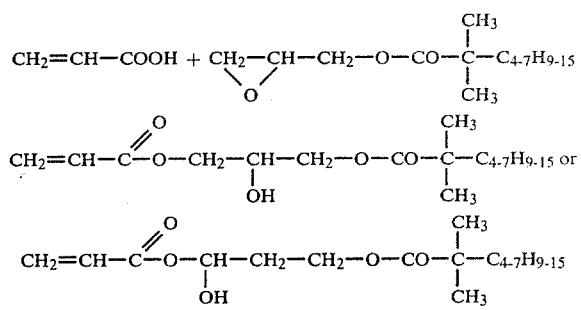

The reaction between the carboxyl and the glycidyl groups is carried out under the conditions of 0.95 to 1.1 mols of acrylic acid per mol of glycidyl esters of α,α-dialkylalkanemonocarboxylic acids of the following empirical formula $C_{12-14}H_{20-26}O_3$, having an epoxide equivalent of 240–250. The acid number of the copolymers is 5 to 12 and is made up by excess acrylic acid and by the organic acids formed as a scission product in the decomposition of peroxides, which acidity is to be regarded as extraneous acid. The hydroxyl group content of the copolymers is 3.5 to 6.5, perferably 4 to 5.5, % by weight. The content of hydroxyl groups in the copolymers is calculated by means of the following formula:

$$\% \text{ of OH} = \frac{1 \text{ mol of OH in g} \times \text{ containing hydroxyl groups} \times 100}{\begin{array}{l}\text{molecular weight of the} \\ \text{compounds containing hydroxyl} \\ \text{groups}\end{array} \times \begin{array}{l}\text{total sample weight} \\ \text{of the components a} \\ \text{to } d_2\end{array}}$$

Thus, the reaction product formed from 1 mol of acrylic acid, which corresponds to 72 g of acrylic acid, and from 1 mol of glycidyl esters of α,α-dialkylalkanemonocarboxylic acids of the following empirical formula $C_{12-14}H_{20-26}O_3$ having an average epoxide equivalent of 245 and corresponding to 245 g of glycidyl esters, gives a molecular weight of 317. Under the conditions of an equivalent conversion, for 10 g of the glycidyl ester mentioned in the preceding text the result is 2.94 g of acrylic acid, which corresponds to a sample weight of 12.94 g of the compound containing hydroxyl groups. The following numerical expression then applies to the formula set out in the preceding text:

$$\frac{17 \text{ g} \times 12.94 \text{ g} \times 100}{317 \text{ g} \times 100 \text{ g total sample weight of the components a to } d_2} = 0.69\% \text{ of OH}$$

The other compounds which contain hydroxyl groups have the following molecular weights: hydroxyethyl acrylate molecular weight 116 and hydroxyethyl methacrylate molecular weight 130. The following percentages of OH result for 26% by weight of hydroxyethyl acrylate in accordance with the following numerical expression:

$$\frac{17 \text{ g} \times 26 \text{ g} \times 100}{116 \text{ g} \times 100 \text{ g total sample weight of the components a to } d_2} = 3.81\% \text{ of OH}$$

The sum of both compounds containing hydroxyl groups, the reaction product from glycidyl ester and acrylic acid as well as hydroxyethyl acrylate, gives a hydroxyl group content of 4.5% of OH.

If the conditions are maintained so that the components a, b and c are employed in such quantities that the copolymers have a hydroxyl group content of 3.5 to 6.5% by weight, preferably 4 to 5.5% by weight, the components a and b should be adjusted to the component c in such a way that the desired hydroxyl group content is achieved.

This means that when smaller percentages by weight of the components a and b are employed, higher percentages by weight of the component c must be selected in order to manufacture the copolymers according to the invention. If higher percentages by weight of the components a and b are employed, smaller percentages by weight of the component c must be selected in order to manufacture the copolymers according to the invention.

The starting point in this approach must always be that the copolymers according to the invention are intended to produce as high a solids content as possible, the relevant test viscosity being the dilution of the copolymer solutions with xylene to a flow viscosity of 25 seconds at 25° C., measured in a DIN cup having a 4 mm flow orifice.

The copolymers according to the invention are manufactured by heating a mixture of the solvents or solvent mixtures, which preferably have a boiling range of 150° to 180° C., and the glycidyl esters of α-alkylalkanemonocarboxylic acids and/or α,α-dialkylalkanemonocarboxylic acids, dissolved in the solvent, to 165° to 180° C. in a reaction flask. The mixtures of monomers a, b, c, $d_1$ and $d_2$ and the peroxide mixtures e and e' are added to this heated mixture in the reaction flask separately or, preferably, together, slowly, uniformly and over a period of time of 6 to 10 hours, the polymerisation temperature not being allowed to fall below 165° C. After the addition of monomer and peroxide, polymerisation is continued for a further 2 to 3 hours at reflux temperature until the solids content of the solution has reached the theoretical value of between 70 and 90% by weight. The copolymers manufactured according to the invention must have the predetermined test viscosity of X to $Z_4$, measured on the Gardner-Holdt scale, for 70% strength by weight copolymer solutions in ethylglycol acetate. The copolymers are manufactured subject to the condition that the polymerisation and condensation reactions proceed simultaneously and jointly at 165° to 180° C.

These new copolymers can be used as the component A in reactive lacquers together with a polyisocyanate component B. The following polyisocyanates can, for example, be employed as the component B. Ethylene diisocyanate, propylene diisocyanate, tetramethylene diisocyanate, hexamethylene diisocyanate, 1,3-dimethylbenzene diisocyanate, 1,4-dimethylcyclohexane diisocyanate, 1-methylcyclohexane-2,4-diisocyanate, 4,4'-methylene-bis(cyclohexyl-diisocyanate), phenylene diisocyanate, 2,4-toluylene diisocyanate, naphthylene diisocyanate, 3-isocyanatomethyl-3,5,5-trimethylcyclohexyl isocyanate, lysine diisocyanate, triphenylmethane triisocyanate, trimethylbenzene-2,4,6-triisocyanate, 1-methylbenzene-2,4,6-triisocyanate and diphenyl-2,4,4'-triisocyanate; diisocyanates or triisocyanates manufactured by reacting a polyisocyanate with a low-molecular diol or triol (for example ethylene glycol, propylene glycol, 1,3-butylene glycol, neopentyl glycol, 2,2,4-trimethyl-1,3-pentanediol, hexanediol, trimethylolpropane or trimethylolethane); and cyanurates which have been obtained by reacting the said diisocyanates with the formation of a ring. A particularly valuable polyisocyanate is the triisocyanate containing biuret groups which is obtained by reacting 3 mols of hexamethylene diisocyanate and one mol of water.

Instead of the polyisocyanates, it is also possible to use compounds which split off polyisocyanates, and also the reaction products, containing isocyanate groups, of polyhydric alcohols with polyisocyanates, for example the reaction product from 1 mol of trimethylolpropane and 3 mols of toluylene diisocyanate, and also trimerised or polymerised isocyanates such as are described, say, in German Pat. No. 951,168.

In addition, it is also possible to use a reaction product, having a NCO content of 16–17% by weight, formed from 1 mol of water and 3 mols of hexamethylene diisocyanate. The last-mentioned reaction product from water and hexamethylene diisocyanate is particularly preferred. The NCO content of the reaction product applied to a 75% strength solution in xylene/ethylglycol acetate.

The reaction of the copolymers A containing hydroxyl groups with the organic polyisocyanates B when used in reactive lacquers can be carried out at 0.5 to 1.3 NCO groups per hydroxyl group, depending on the end use of the reaction products. It is preferable to carry out the reaction in such a way that the quantities of the organic polyisocyanate, relative to the total hydroxyl content of the components present in the reaction mixture, are present in a quantity of 0.7 to 1.0 isocyanate group per hydroxyl group.

In order to use the new copolymers, the mixtures of copolymers A containing solvent and containing hydroxyl groups and of polyisocyanate B are supplied to the appropriate substrates in the simplest manner imaginable, possibly after adding known auxiliaries, such as levelling agents, pigments or dyestuffs, by spraying, dipping, pouring, brushing or other suitable measures, and the sheet-like structures are dried at room temperature; in special cases, perhaps when using compounds which split off isocyanates, it is possible to stove the coatings; this depends essentially on the substrates used and on the requirements set by practical use on the coatings.

The copolymers which can be obtained by the process can be employed, together with polyisocyanates, for the production of coatings or coverings in the reactive lacquers already illustrated, on substrates of the most diverse types, for example porous or non-porous substrates, such as textile non-wovens, leather or plastics. The production of coatings on wood or metals should be singled out particularly. In every case high-gloss, pore-free, elastic and solvent-resistant coatings which have a very hard surface and which can be treated both with strong inorganic acids and with strong alkali metal hydroxide solutions without the coatings being attacked even to the slightest extent, are obtained. Coatings of this type display, in addition, an outstanding resistance to weathering and resistance to yellowing.

In pigmented coating compositions based on the polyisocyanate reactive lacquer/binder solutions according to the invention the total content of solids in the coating composition is between 62 and 90% by weight, preferably between 67 and 90% by weight. The ratio of pigment to binder can be between 1:20 and 2:1. The following can be added as pigments: inorganic pigments, such as chrome yellow, Prussian blue, Brunswick green and titanium pigments, for example titanium dioxide, extended titaniun pigments (which are extended either with precipitated or with natural extenders, such as alkaline earth metal sulphates, for example calcium sulphate and barium sulphate), tinted titanium pigments and titanates, such as barium, tin, lead and magnesium titanates. Other types of inorganic pigments can also be used, for example zinc sulphide pigments, such as zinc sulphide, lithopone, extended zinc sulphide pigments, such as lithopone on a calcium base, and zinc sulphide extended with natural extenders, zinc oxide or antimony oxide or organic pigments, that is to say organic dyestuffs which are free from sulphonic acid groups, carboxylic acid groups or other groups which impart solubility in water. Pigments also include, conceptually, other water-insoluble organic dyestuffs, for example calcium or barium lakes of azo dyestuffs.

The constituents of the stoving lacquers to be used can be processed to give lacquers by customary processes, preferably as follows. The pigment and a suitable quantity of solvent are mixed with part of the copolymers according to the invention to give a pasty or solid pigment paste. After the mixture has been thoroughly dispersed in a stirred ball mill, the remainder of the copolymer and other additives are added to the resulting paste or dispersion and the mixture is then formulated, using the solvents, preferably xylene, butyl acetate and/or ethylglycol acetate or acetone, to a sprayable viscosity at a solids content of 62 to 90% by weight, preferably 67 to 90% by weight, of non-volatile substances.

EXAMPLE 1

(A) 28 g of ethylglycol acetate (=21.9% by weight) and (B) 100 g of component B (=78.1% by weight, being a mixture of: (a) 11.7 g of glycidyl esters of $\alpha,\alpha$-dialkylalkanemonocarboxylic acids of the following empirical formula $C_{13}H_{24}O_3$, having an epoxide equivalent of 240–250, designated in the following text only as glycidyl esters of $\alpha,\alpha$-dialkylmonocarboxylic acids) are heated to 167° C. in a flask equipped with a stirrer, a reflux condenser and a water separator as well as a thermometer, and a mixture consisting of (b) 25.5 g of hydroxyethyl acrylate, (c) 3.3 g of acrylic acid, ($d_1$) 46.2 g of styrene, ($d_2$) 13.3 g of methyl methacrylate, it being necessary that the % by weight of the components a, b, c, $d_1$ and $d_2$ add up to 100% by weight, (e) 2.7 g of tert.-butyl perbenzoate=2% by weight and (e') 2.0 g of 80% strength cumene hydroperoxide=1.2% by weight, the % by weight figures relating to the total mixture of the components A and B, is added uniformly, at a temperature which rises to 170° C., in the course of 7 hours, while the mixture boils and the reflux is cooled. After the addition is complete, polymerisation is continued for a further 2 hours until a solids content of 81.0% by weight is reached. This example illustrates the most preferred embodiment of the invention.

The acid number of the solid constituent is 7.5. The viscosity of a 70% strength by weight solution in ethylglycol acetate is $Z_2$ to $Z_3$ on the Gardner-Holdt scale. When the solution is formulated with xylene to a viscosity of 25 seconds at 25° C., measured in a DIN cup having a 4 mm flow orifice, it has a solids content of 47% by weight. The copolymer has a hydroxyl group content of 4.5% by weight.

COMPARISON TEST ACCORDING TO THE STATE OF THE ART

Comparison test 1 (with reference to the Example in French Pat. No. 1,556,309, which is the nearest approach to the invention). The hydroxyl group content, relative to the copolymers, in Examples 1 to 10 in French Pat. No. 1,556,309 is as follows:

in Example 1=0.8% of hydroxyl groups
in Example 2=1% of hydroxyl groups
in Example 3=1.26% of hydroxyl groups
in Example 4=1.52% of hydroxyl groups
in Example 5=1.41% of hydroxyl groups
in Example 6=1.41% of hydroxyl groups
in Example 7=1.66% of hydroxyl groups
in Example 8=1.85% of hydroxyl groups
in Example 9=1.85% of hydroxyl groups
in Example 10=3.18% of hydroxyl groups.

Example 10 in French Pat. No. 1,556,309, which has a hydroxyl group content of 3.18%, is the nearest approach to the invention. The procedure described in Example 10 of French Pat. No. 1,556,309 is followed.

10 parts by weight of 2-hydroxyethyl methacrylate,
30 parts by weight of methyl methacrylate,
25 parts by weight of styrene,
15 parts by weight of ethyl acrylate,
20 parts by weight of the reaction product obtained in accordance with reaction (a),
1.3 parts by weight of lauryl mercaptan,
1.5 parts by weight of azobisisobutyronitrile
20 parts by weight of butyl acetate,
20 parts by weight of ethyl acetate,
30 parts by weight of toluene,
10 parts by weight of ethylglycol acetate and
20 parts by weight of xylene
were converted into a copolymer solution. The viscosity of the 50% strength by weight solution is R on the Gardner-Holdt scale.

The copolymer solution exhibits a considerable sediment and is also turbid. The solid constituents which had precipitated could be filtered off by filtration. The turbidity of the resin solution could not be removed. When the solution is formulated with xylene to a viscosity of 25 seconds at 25° C., measured in a DIN cup having a 4 mm flow orifice, it has a solids content of 37% by weight. The copolymer has a hydroxyl group content of 3.18% by weight.

COMPARISON TEST WITH REFERENCE TO THE STATE OF THE ART AND THE INVENTIVE CONCEPTION OF THE PRESENT INVENTION

Comparison test 2

The procedure described in Comparison test 1 is followed, but only the monomers were aligned with Example 1 according to the invention. The following were used: 25.5% by weight of hydroxyethyl acrylate, 13.3% by weight of methyl methacrylate, 46.2% by weight of styrene and 15% by weight of reaction product obtained in accordance with reaction (a) of French Pat. No. 1,556,309. The copolymer solution exhibited a particularly strong, milky turbidity which could not be removed by filtration. The copolymer has a hydroxyl group content of 4.5% by weight. The viscosity of the 50% strength by weight solution was Z at 20° C., measured on the Gardner-Holdt scale. When the solution was formulated with xylene to a viscosity of 25 seconds at 25° C., measured in a DIN cup having a 4 mm flow orifice, a solids content of 28% by weight resulted.

Comparison Test 3

The procedure described in Example 1 of the present invention was carried out, but, in divergence, polymerisation was carried out at a temperature of 160° C. and tert.-butyl perbenzoate alone was used. The viscosity of the 70% strength by weight solution is ethylglycol acetate, measured on the Gardner-Holdt scale, is higher than $Z_6$. The resin solution exhibits a turbidity which could not be removed by filtration. When the solution was formulated with xylene to a viscosity of 25 seconds at 25° C., measured in a DIN cup having a 4 mm flow orifice, a solids content of 38% by weight resulted.

Comparison test 4

The procedure described in Example 1 of the present invention was carried out, but, in divergence, polymerisation was carried out at a temperature of 160° C. and cumene hydroperoxide alone was used, as an 80% strength solution in a mixture of alcohols, ketones and cumene. The viscosity of the 70% strength by weight solution in ethylglycol acetate, measured on the Gardner-Holdt scale, is higher than $Z_6$. The resin solution exhibits a strong turbidity which cannot be removed by filtration. When the solution was formulated with xylene to a viscosity of 25 seconds at 25° C., measured in a DIN cup having a 4 mm flow orifice, a solids content of 34% by weight resulted.

EXAMPLE 2

A. 28 g of ethylglycol acetate=21.9% by weight and B. 100 g of component B=78.1% by weight, including (a) 24 g of glycidyl esters, as described in Example 1, are heated to 172° C. in a flask equipped with a stirrer, a reflux condenser and a water separator and a thermometer, and a mixture consisting of (b) 19.1 g of hydroxyethyl methacrylate, (c) 7.2 g of acrylic acid, (d₁) 28.1 g of styrene and (d₂) 21.6 g of methyl methacrylate, it being necessary that the % by weight of the components a, b, c, d₁ and d₂ add up to 100% by weight, (e) 2.7 g of tert.-butyl perbenzoate=2% by weight and (e') 2.0 g of 80% strength cumene hydroperoxide=1.2% by weight, the % by weight figures relating to the total mixture of components A and B, is added uniformly in the course of 7 hours while the mixture boils and the reflux is simultaneously cooled. After the addition is complete, polymerisation is continued for a further 2 hours until a solids content of 80% by weight has been reached. The acid number of the solid component is 11. The viscosity of the 70% strength by weight solution in ethylglycol acetate is Y - Z, measured on the Gardner-Holdt scale. When the solution is formulated with xylene to give a viscosity of 25 seconds at 25° C., measured in a DIN cup having a 4 mm flow orifice, it has a solids content of 52% by weight. The copolymer has a hydroxyl group content of 4.17% by weight. The copolymer solution contains no insoluble solid constituents and is free from turbidity.

Preparation of thermoplastic copolymer 1

600 g of toluene, 200 g of ethyl methacrylate, 4 g of acrylic acid and 296 g of methyl methacrylate are heated to reflux temperature in a flask equipped with a stirrer and a reflux condenser and a water separator, and the following mixture, consisting of: 150 g of toluene and 3.5 g of dibenzoyl peroxide, as a 75% strength suspension in water, is added uniformly in the course of 2 hours. After a polymerisation time of 2 hours, a further 2 g of dibenzoyl peroxide, as a 75% strength suspension in water, are added and polymerisation is continued under reflux. The solids content of the solution is 40% by weight. The viscosity of the solution exhibits a value of X - Y, measured at 25° C. on the Gardner-Holdt scale. The acid number is 5.

Preparation of thermoplastic copolymer 2

300 g of xylene, 1.5 g of methacrylic acid and 300 g of methyl methacrylate are heated to 85° C. in a flask equipped with a stirrer and a reflux condenser and a water separator, and the following mixture, consisting of: 50 g of xylene and 2.5 g of dibenzoyl peroxide, as a 75% strength suspension in water, are added uniformly in the course of 3 hours. After polymerisation for 2 hours at the same temperature, a further ... g of dibenzoyl peroxide, as a 75% strength suspension in water, are added and polymerisation is continued for a further 2 hours until the theoretical solids content of 46% by weight has been reached. When the solution is diluted with n-butanol to 40% by weight, it has a viscosity of $Z_3$–$Z_4$, measured at 25° C. on the Gardner-Holdt scale. The acid number of the polymer is 4.

EXAMPLE 3

Reactive lacquer based on 70% by weight of copolymer and 30% by weight of an organic triisocyanate, both relative to the weight of solid.

61.6 g of copolymer 1 solution in ethylglycol acetate (obtained according to Example 1, dissolved solids 81% by weight) are dissolved in a 1:1 mixture of xylene and ethylglycol acetate together with 28.6 g of a 75% strength by weight solution of a triisocyanate which has a NCO content of 16.5 to 17.0% by weight and has been obtained by reacting 3 mols of hexamethylene diisocyanate and 1 mol of water. 0.5 g of diethylethanolamine is added and thoroughly mixed and the mixture is formulated by adding xylene to a spraying viscosity, namely 25 seconds at 25° C., measured in a DIN cup having a 4 mm flow orifice. The lacquer was applied to glass sheets at a wet film layer thickness of 90 μm and was dried in the air at 18° to 20° C. The pendulum hardness, measured by König's method (DIN 53,157), is 60 seconds after one day, 140 seconds after three days and 180 seconds after seven days. Films which had been stoved at 80° C. for 30 minutes gave pendulum hardness figures of 102 seconds, rising to 180 seconds after being stored for one day at room temperature and to 202 seconds after 3 days. Films which had been stoved at 120° C. for 30 minutes gave pendulum hardness figures of 203 seconds which did not change further on storage. The cured films were particularly insensitive towards the fingernail test and had very good resistance against xylene and acetone.

After weathering for 18 months in the Florida climate, a top lacquering (pigmented with 0.6 part by weight of rutile: 1 part by weight of binder combination) which had been applied to primed zinc-phosphated steel sheets exhibited a loss of gloss of only 10% compared with gloss measured before the weathering.

Black lacquers with a particularly high gloss are obtained if 20 parts by weight of carbon black FW 200 together with 270 parts by weight of copolymer 1 solution, calcium naphthenate and silicone oil, as a 1% strength solution in xylene, and using a corresponding quantity of xylene and butyl acetate, are subjected to a grinding process for about 30 to 40 minutes, using a sand mill. After adding a further 270 parts by weight of copolymer 1 solution and formulating the mixture with xylene/ethylglycol acetate in the proportions of 1:1 to a viscosity of 25 seconds in a DIN cup having a 4 mm flow orifice, lacquers which are stable to flocculation for several months are obtained. A reactive lacquer based on 70% by weight of copolymer and 30% by weight of an organic triisocyanate which has been obtained by reacting 3 mols of hexamethylene diisocyanate and 1 mol of water, is prepared. Coatings which have been produced therewith and which are stoved at 80° C. for 30 minutes give films with an insensitive surface, so that in the repair lacquering of vehicles the adhesive masking tapes can be removed while the films are in an incompletely cooled condition and assembly can be carried out. After storing for 8 hours at 23° C., the pot life of a clear lacquer combination prepared from copolymer 1 ethylglycol acetate solution and the triisocyanate and formulated with xylene to a viscosity of 25 seconds, is such that the viscosity is 40 seconds, measured at 25° C. in a DIN cup having a 4 mm flow orifice. The result of this is that the binder combination can be used throughout a working day of at least 8 hours, since a doubling of viscosity to 50 seconds is tolerated by the lacquer user.

EXAMPLE 4

Reactive lacquer based on 70% by weight of copolymer and 30% by weight of an organic triisocyanate, both relative to the weight of solids.

62.5 g of copolymer 2 ethylglycol acetate solution (obtained according to Example 2, dissolved solids 80% by weight) are dissolved in a 1:1 mixture of xylene and ethylglycol acetate together with 28.6 g of a 75% strength by weight solution of a triisocyanate which has a NCO content of 16.5–17.0% by weight and which has been obtained by reacting 3 mols of hexamethylene diisocyanate and 1 mol of water, and 0.5 g of diethylethanolamine is mixed in and the mixture is formulated with xylene to a spraying viscosity of 25 seconds at 25° C., measured in a DIN cup having a 4 mm flow orifice, and is applied to glass sheets at a wet film layer thickness of 90 μm and dried in the air at 18° to 20° C. The pendulum hardness, measured by König's method (DIN 53,157), is 45 seconds after one day, 110 seconds after three days and 180 seconds after seven days. Films which had been stoved at 80° C. for 30 minutes gave pendulum hardness figures of 75 seconds, rising after storage at 23° C. for one day to 130 seconds and to 162 seconds after four days. Films which had been stoved at 120° C. for 30 minutes gave pendulum hardness figures of 165 seconds which did not change further on storage. The cured films were particularly insensitive towards premium-grade motor fuels and xylene.

After 16 months weathering in the Florida climate, a top lacquering (pigmented with 0.65 part by weight of rutile: 1 part by weight of binder combination) which had been applied to primed, zinc-phosphated steel sheets gave a loss of gloss of only 12% compared with gloss measured before the weathering.

FURTHER COMPARATIVE TESTS TO DEMONSTRATE THE TECHNICAL PROGRESS ACHIEVED

Assessment of the appearance of the copolymer solutions

The resin solutions are assessed for the flocculation of solid, insoluble constituents and for turbidity in the resin solutions. As tests have shown, the solid, insoluble constituents can be filtered off. Turbidity in the resin solutions is not removed by filtration (see Table 1). 1 = clear solution (highest value) 5 = very strong, milky turbidity (lowest value)
0 = no flocculation
+ = flocculation of solid constituents As the results in Table 1 show, the copolymer solution manufactured according to the invention is markedly superior to the known copolymer solutions.

Preparation of black top lacquers and assessment of the gloss of the films

With the aid of a sand mill, grinding for a period of about 60 minutes, a lacquer is prepared from the following components:
270 g of copolymer solution manufactured according to the invention, from Example 1,
20 g of carbon black, described in Messrs. Degussa's leaflet FW 200,
4 g of diethylethanolamine,
10 g of silicone oil, described in Messrs. Bayer's leaflet Silikonöl L 050, as a 1% strength solution in xylene,
10 g of calcium naphthenate, liquid with a 4% calcium content,
65 g of butyl acetate and
70 g of xylene.

After adding a further 270 g of copolymer solution manufactured according to the invention, in accordance with Example 1, and diluting with a solvent mixture composed of equal parts by weight of xylene and butyl acetate to a flow viscosity of 23 seconds at 20° C., measured in a DIN cup having a 4 mm flow orifice, the lacquer is poured onto vertical glass sheets and the degree of gloss is tested after the solvent has evaporated. High-gloss films are obtained which exhibit no deposition of pigment in the range between 1 and 10 μm. The proportion by weight of binder to pigment is 95.6% by weight of binder to 4.4% by weight of pigment. The pigmentation and the draining off are carried out in an identical manner for the copolymers in Comparison tests 1, 2, 3 and 4 and the gloss and the deposition of pigment of the lacquers are assessed. As the results in Table 1 show, the copolymer solution manufactured according to the invention is superior to the known copolymer solutions.

1 = high-gloss films with no deposition of pigment (highest value)
5 = matt films and very considerable deposition of pigment (lowest value)

TESTING THE COMPATIBILITY OF THE COPOLYMER SOLUTIONS ACCORDING TO THE INVENTION, OF EXAMPLE 1 AND 2, AND THE COMPARISON TESTS 1 AND 2, WITH THE THERMOPLASTIC COPOLYMERS 1 AND 2

62 parts by weight of the copolymer solution obtained according to Example 1, consisting of 50 parts by weight of copolymer and 12 parts by weight of ethylglycol acetate, are mixed with 125 parts by weight of the thermoplastic copolymer solution 1, consisting of 50 parts by weight of thermoplastic copolymer and 75 parts by weight of toluene, and the mixture is diluted with a solvent mixture consisting of xylene and butyl acetate in a 1:1 ratio by weight to a solids content of 40% by weight and is applied to glass sheets, a dry film layer thickness of 250 to 300 μm being achieved. After drying at room temperature, the appearance and the compatibility of the films were investigated. This mixture consists of 50% by weight of copolymer 1 according to the invention and 50% by weight of the thermoplastic copolymer 1. The copolymer solutions manufactured according to the invention, of Example 1 and 2, and the copolymers from Comparison tests 1 and 2 were mixed with the thermoplastic copolymers 1 and 2 in the manner described above and the mixtures were applied to glass sheets and the resulting films were assessed. As the results in Table 2 show, the copolymer solutions manufactured according to the invention are markedly superior to the known copolymer solutions.

| Test for appearance of film: | 1 = high-gloss (highest value) 5 = very cloudy film (lowest value) |
| --- | --- |

Testing the pot life of reactive lacquers 86.6 g of the copolymer solution manufactured according to the invention, of Example 1, and 40 g of a 75% strength by weight solution of a triisocyanate which contains biuret groups and has a NCO content of 16.5 to 17.0% by weight and has been obtained by reacting three mols of hexamethylene diisocyanate and one mol of water, are mixed and are diluted with xylene to a flow viscosity of 25 seconds at 25° C., measured in a DIN cup having a 4 mm flow orifice, and the rise in viscosity is determined after 6 hours storage at 23° C. The mixing ratio is 70% by weight of the copolymer manufactured according to the invention, from Example 1, and 30% by weight of the triisocyanate which contains biuret groups.

A comparison combination is composed of 70% by weight of copolymer from Comparison test 2 and 30% by weight of the triisocyanate which contains biuret groups.

A further comparison combination is composed of 77% by weight of copolymer from Comparison test 1 and 23% by weight of the triisocyanate which contains biuret groups, as described in French Pat. No. 1,556,309.

The viscosity is adjusted in the same way, using the solvent mixture described above. As the results in Table 3 show, the reactive lacquers according to the invention are markedly superior to the known reactive lacquers, since they have a longer application life.

PREPARATION OF PIGMENTED TWO-COMPONENT REACTIVE LACQUERS AND TESTING THE TENDENCY OF THE STOVED FILMS TO RUN OFF

The ratio in the combination is 65% by weight of copolymer manufactured according to the invention and 35% by weight of triisocyanate containing biuret groups. The proportion by weight of pigment: binder is 42% by weight: 58% by weight.

A lacquer paste is prepared by grinding in a ball mill for 24 hours from the following components: 80 g of copolymer solution manufactured according to the invention of Example 1, 73 g of titanium dioxide (rutile), 0.5 g of diethylethanolamine, 2.5 g of silicone oil, described in Messrs. Bayer's leaflet Silkonöl L 050, as a 1% strength solution in xylene, 2 g of calcium naphthenate, liquid with a 4% calcium content, 4.5 g of Bentone-38 paste, as a 10% strength by weight solution in xylene/methyl isobutyl ketone in the proportions by weight of 86:4, described in Messrs. Kronos Titan's leaflet, and a solvent mixture consisting of xylene and ethylglycol acetate in the proportion of 1:1 by weight. To this mixture are added 46.6 g of a 75% strength by weight solution of a triisocyanate which contains biuret groups and has a NCO content of 16.5 to 17.0% by weight and has been obtained by reacting 3 mols of hexamethylene diisocyanate and one mol of water, and which is dissolved in a mixture of xylene and ethylglycol acetate. This mixture is then diluted with a mixture of xylene, butyl acetate and ethylglycol acetate in the proportions of 1:1:1 by weight, to a flow viscosity of 22 seconds at 23° C., measured in a DIN cup having a 4 mm flow orifice. This reactive lacquer is applied by the spray application process to vertical steel sheets in such a way that dry film layer thicknesses of 80 μm are achieved. The time of exposure to air between individual spray applications should be at most 30 seconds to one minute. After the spray application has been carried out, the material is exposed to the air for approx. 5 minutes and the lacquer film is stoved at 120° C. for 30 minutes.

1. Comparison test of the tendency to run off

The ratio in the combination is 77% by weight of copolymer from Comparison test 1 and 23% by weight of triisocyanate containing biuret groups. The proportion by weight of pigment:binder is 42% by weight:58% by weight.

2. Comparison test of the tendency to run off

The ratio in the combination is 65% by weight of copolymer from Comparison test 2 and 35% by weight of triisocyanate containing biuret groups. The proportion by weight of pigment:binder is 42% by weight:58% by weight.

The pigmentation and the spray application to vertical steel sheets are carried out in the same way for the above Comparison tests 1 and 2 as for the copolymer 1 manufactured according to the invention and described above. The films are stoved at 120° C. for 30 minutes. As can be seen from Table 3, the reactive lacquers manufactured according to the invention are markedly superior to the known reactive lacquers by virtue of lower tendency to run off.

FURTHER COMPARISON TESTS WITH REACTIVE LACQUERS BASED ON THE COPOLYMER SOLUTIONS ACCORDING TO THE INVENTION AND POLYISOCYANATES, IN COMPARISON WITH THE KNOWN REACTIVE LACQUERS OF FRENCH PAT. NO. 1,556,309

A reactive lacquer composed of 70% by weight of copolymer, which corresponds to 86.6 g of the copolymer solution manufactured according to the invention, of Example 1, and 30% by weight of triisocyanate, which corresponds to 40 g of a 75% strength by weight solution of a triisocyanate which has been prepared from 3 mols of hexamethylene diisocyanate and one mol of water and which has a NCO content of 16.5 to 17.0% by weight and which is dissolved in a mixture of xylene and ethylglycol acetate, is diluted with acetone to a flow viscosity of 40 seconds at 25° C., measured in a DIN cup having a flow orifice of 4 mm. The solids content of this dilute resin solution is determined by evaporating it at 120° C. for 60 minutes.

The resin solution is applied by spraying to a steel sheet using one and a half cross-coats, the material being exposed to the air for approx. 1 minute between each cross-coat. After the lacquered steel sheet has been exposed to the air for a time of 5 minutes, it is stoved at 120° C. for 30 minutes. A smooth, blister-free and crater-free lacquer with a dry film alyer thickness of 70 to 80 μm was obtained.

A reactive lacquer composed of 70% by weight of copolymer, which corresponds to 87.6 g of the copolymer solution according to the invention, of Example 2, and 30% by weight of triisocyanate, which corresponds to 40 g of the triisocyanate described above, is made up by mixing and is diluted as described above, its solids content is determined and it is used to lacquer a steel sheet. After stoving, the lacquered steel sheet has a dry film layer thickness of 70 to 80 μm and exhibits no craters or blisters.

A reactive lacquer composed of 82.0% by weight of copolymer 1, which corresponds to 61.8 g of the copolymer solution according to the invention, from Example 1, and 18.0% by weight, corresponding to 11 g, of 3-isocyanatomethyl-3,5,5-trimethylcyclohexyl isocyanate, is made up by mixing and is diluted with acetone, as described above, to the same viscosity, its solids content is determined and it is used, as described above, to lacquer a steel sheet. After stoving, the lacquered steel sheet exhibits no formation of craters or blisters and has a smooth surface at a dry film layer thickness of 70 to 80 μm.

A reactive lacquer composed of 82.0% by weight of copolymer 2, which corresponds to 62.5 g of the copolymer solution manufactured according to the invention, of Example 2, and 18.0% by weight, corresponding to 11 g, of 3-isocyanatomethyl-3,5,5-trimethylcyclohexyl isocyanate is made up by mixing and, as described above, is diluted with acetone to the viscosity described above. The solids content of the resin solution was determined and a steel sheet was lacquered and stoved as indicated above. The lacquered sheet had a dry film layer thickness of 80 μm and gave a smooth, crater-free and blister-free surface.

The known reactive lacquers having the percentages by weight indicated in Table 4 are diluted with acetone in the same way to a flow viscosity of 40 seconds at 25° C., measured in a DIN cup having a 4 mm flow orifice. The resin solutions are also applied by spraying, at one and a half cross-coats, the material being exposed to the air in each case for approx. 1 minute after every half cross-coat. After the reactive lacquers have been applied, the material is exposed to the air for 5 minutes and stoved at 120° C. for 30 minutes. At first, only films having a dry film layer thickness of 40 to 50 μm were obtained. The surface exhibited many craters and blisters. If it is desired to reach layer thicknesses of the dry film of 70 to 80 μm with the known reactive lacquers, the spray application process must be increased to two and a half to three cross-coats. The films which were then stoved exhibited an even more strongly marked formation of blisters and craters than the films having lower dry film layer thicknesses. In addition, the solids content of the dilute resin solutions was determined as described above.

Additional advantages for the copolymer solutions according to the invention emerge clearly from these comparison tests.

|  | Example 1 according to the invention | Comparison test 1 | Comparison test 2 | Comparison test 3 | Comparison test 4 |
|---|---|---|---|---|---|
| Determination of the solids content of the copolymer solutions at 120° C./60 minutes | 81% | 50% | 50% | 80% | 80% |
| Appearance of the copolymer solutions — Turbidity | 1 | 2–3 | 4 | 3 | 5 |
| Appearance of the copolymer solutions — Flocculation of solid constituents | 0 | + | 0 | 0 | 0 |
| Solids content, determined at 120° C./60 minutes, of the resin solutions diluted with xylene to a flow viscosity of 25 seconds at 25° C., measured in a DIN cup having a 4 mm flow orifice | 47% | 37% | 28% | 38% | 34% |
| Viscosity, measured at 23° C. on the Gardner-Holdt scale, of the resin solutions diluted with ethylglycol acetate to 70% solids content | $Z_2$ | — | — | the viscosity is higher than $Z_6$ | the viscosity is higher than $Z_6$ |

-continued

|  | Example 1 according to the invention | Comparison test 1 | Comparison test 2 | Comparison test 3 | Comparison test 4 |
|---|---|---|---|---|---|
| Assessment of gloss and pigment deposition for black top lacquer | 1 | 2–3 | 5 | 3 | 5 |

| | copolymers 1 and 2 for compatibility with the thermoplastic copolymers 1 and 2 | | | |
|---|---|---|---|---|
| | 50% by weight of the copolymer 1 according to the invention, in Example 1 | 50% by weight of the copolymer in the comparison copolymer 1 | 50% by weight of the copolymer in the comparison copolymer 2 | 50% by weight of the copolymer 2 according to the invention, in Example 2 |
| 50% by weight of the thermoplastic copolymer 1 | 1 | 2–3 | 4–5 | 1 |
| 50% by weight of the thermoplastic copolymer 2 | 1 | 2–3 | 4–5 | 1 |

Testing for film appearance:
1 = high-gloss film (highest value)
5 = matt film (lowest value)

| | according to the invention and the comparison tests 1 and 2, with triisocyanate | | |
|---|---|---|---|
| | 70% by weight of copolymer 1 according to the invention and 30% by weight of triisocyanate containing biuret groups | 77% by weight of copolymer from comparison copolymer 1 and 23% by weight of triisocyanate containing biuret groups | 70% by weight of copolymer from comparison copolymer 2 and 30% by weight of triisocyanate containing biuret groups |
| After stoving at 120° C. for 30 minutes, the films are tested with acetone by means of a cotton wool pad, with an exposure of 5 minutes | slight swelling | fairly strong swelling | slight swelling |
| Determination of the pot life at 23° C. after storage for 6 hours | increase in viscosity to 30 seconds | increase in viscosity to 45 seconds | increase in viscosity to 95 seconds |
| Test of run-off tendency and crater-formation in the lacquer combinations which are pigmented with titanium dioxide and stoved at 120° C. for 30 minutes | at a dry film layer thickness of 80 μm, no run-off tendency and no crater-formation | at a dry film layer thickness of 50 to 60 μm, considerable run-off tendency, at 70 to 80 μm, considerable crater-formation | at a dry film layer thickness of 40 to 50 μm, considerable run-off tendency, at 50 to 60 μm, considerable crater-formation |

TABLE 4

| | Solids content in % by weight of the diluted resin solutions | Appearance, after stoving, of the films obtained from the reactive lacquers |
|---|---|---|
| Reactive lacquer composed of 70% by weight of copolymer manufactured according to the invention, from Example 1, and 30% by weight of triisocyanate | 67.5 | at 70–80 μm, no blistering or crater-formation |
| Reactive lacquer composed of 70% by weight of copolymer manufactured according to the invention, from Example 2, and 30% by weight of triisocyanate | 70.2 | at 70–80 μm, no blistering of crater-formation |
| Reactive lacquer composed of 82.0% by weight of copolymer manufactured according to the invention, from Example 1, and 18.0% by weight of isophorone diisocyanate + | 68 | at 70–80 μm, no blistering of crater-formation |
| Reactive lacquer composed of 82.0% by weight of copolymer | | at 70–80 μm, no blistering or crater-formation |

TABLE 4-continued

| | Solids content in % by weight of the diluted resin solutions | Appearance, after stoving, of the films obtained from the reactive lacquers |
|---|---|---|
| manufactured according to the invention, from Example 2, and 18.0% by weight of isophorone diisocyanate + | 72 | |
| Reactive lacquer composed of 77% by weight of comparison copolymer 1 and 23% by weight of triisocyanate | 52 | at 40-50 μm, blistering and crater-formation; at 70-80 μm, increased blistering and crater-formation |
| Reactive lacquer composed of 70% by weight of comparison copolymer 2 and 30% by weight of triisocyanate | 47 | at 40-50 μm, considerable blistering and crater-formation; at 70-80 μm, the whole film is full of blisters and craters |
| Reactive lacquer composed of 85.7% by weight of comparison copolymer 1 and 14.3% by weight of isophorone diisocyanate + | 52.5 | at 40-50 μm, blistering and crater-formation; at 70-80 μm, increased blistering and crater-formation |
| Reactive lacquer composed of 82.0% by weight of comparison copolymer 2 and 18.0% by weight of isophorone diisocyanate + | 48 | at 40-50 μm, considerable blistering and crater-formation; at 70-80 μm, 75% of the film is full of blisters and craters |

As can be seen from TABLE 4, the reactive lacquers manufactured according to the invention are superior to the known reactive lacquers.

+3-Isocyanatomethyl-3,5,5-trimethylcyclohexyl isocyanate

I claim:

1. A coating composition containing as an essential ingredient
    (A) a copolymer solution of (I) 10 to 30% by weight of inert organic solvent and (II) 70 to 90% by weight—both percentages of (I) and (II) to 100% by weight—of copolymers containing hydroxyl groups which have been manufactured by heating to 150° to 180° C., in the presence of a mixture of diacyl peroxides or peresters and alkyl hydroperoxides or dialkyl peroxides as polymerisation initiators, a mixture of inert solvents having a boiling range of 150° to 180° C. and (a) 5–24% by weight of glycidyl esters of α-alkylalkanemonocarboxylic acids and/or α,α-dialkylalkanemonocarboxylic acids of the following empirical formula $C_{12-14}H_{20-26}O_3$, or of a mixture of glycidyl esters of α,α-dialkylalkanemonocarboxylic acids having a content up to about 10% by weight of the mixture of glycidyl esters of α-alkylalkanemonocarboxylic acids of the said empirical formula and having an epoxide equivalent of 240 to 250, to which a mixture of (b) 12–30% by weight of hydroxyethyl acrylate and/or hydroxyethyl methacrylate, (c) 1–10% by weight of acrylic acid, ($d_1$) 20–50% by weight of styrene and ($d_2$) 5–35% by weight of methyl methacrylate has been added, the components a, b, c, $d_1$ and $d_2$ having been employed in such quantities that their total is 100% by weight and the polymerisation and condensation reactions having proceeded simultaneously and jointly and the components a, b and c having been employed in such quantities that the copolymers have a hydroxyl group content of 3.5 to 6.5% by weight and
    (B) a further component $B_1$ or $B_2$,
said components A and B being applied in a ratio of 60 to 80% by weight of component A and 20 to 40% by weight of component ($B_1$) which is an organic polyisocyanate or in a ratio of 20 to 80% by weight of component A and 80 to 20% by weight of component ($B_2$) which is a thermoplastic copolymer prepared from 98 to 99.5% by weight of methyl methacrylate, ethyl methacrylate or both and 0.5 to 2% by weight of methacrylic or acrylic acid, the sum of the percentages of ($B_2$) and the components (A) and (B) always being 100% by weight.

2. A method for preparing a coating composition as claimed in claim 1, which comprises mixing the copolymer solution (A) with an organic polyisocyanate ($B_1$).

3. A method according to claim 2, wherein the copolymer solution component (A) constitutes 63 to 68% by weight of the total composition and the organic polyisocyanate ($B_1$) is an organic triisocyanate which constitutes 32 to 37% by weight of the total composition, said organic triisocyanate ($B_1$) having been obtained by reacting 3 moles of hexamethylene diisocyanate with 1 mol of water, said components (A and $B_1$) constituting 100% by weight of the total composition.

4. A method for preparing a coating composition as claimed in claim 1, which dries by physical means and which comprises mixing the copolymer solution (A) with a thermoplastic copolymer ($B_2$).

5. A coating which dries by physical means in the air and which contains, as the binder, a mixture consisting of:
    (A') 20–80% by weight of copolymers which contain hydroxyl groups and which have been manufactured by heating to 150° to 180° C., in the presence of mixtures of diacyl peroxides or peresters and alkyl hydroperoxides or dialkyl peroxides as the polymerization initiators, a mixture of inert solvent having a boiling range of 150° to 180° C. and the component to be esterified, that is to say (a) 5–24% by weight of glycidyl esters of α-alkylalkanemonocarboxylic acids and/or α,α-dialkylalkanemonocarboxylic acids of the following empirical formula $C_{12-14}H_{20-26}O_3$, or a mixture of glycidyl esters of α,α-dialkylalkanemonocarboxylic acids having a content up to about 10 percent by weight of the mixture of glycidyl esters of α-alkylalkanemonocarboxylic acids of the said empirical formula, the mixture having an epoxide equivalent of 240 to 250, with the slow, uniform addition of (b) 12–30% by weight of hydroxyethyl acrylate and/or hydroxyethyl methacrylate, (c) 1–10% by weight of acrylic acid, (d$_1$) 20–50% by weight of styrene and (d$_2$) 5–35% by weight of methyl methacrylate, the components a, b, c, d$_1$ and d$_2$ having been employed in such quantities that their sum adds up to 100% by weight and the polymerisation and condensation reactions proceeding simultaneously and jointly and the additional condition applying that the components a, b and c have been employed in such quantities that the copolymers have a hydroxyl group content of 3.5 to 6.5% by weight, and (B″) 80–20% by weight of thermoplastic copolymers manufactured from 98–99.5% by weight of methyl methacrylate and/or ethyl methacrylate and 0.5–2% by weight of methacrylic acid or acrylic acid, it being necessary that the components A′ and B″ add up to 100% by weight.

* * * * *

UNITED STATES PATENT AND TRADEMARK OFFICE
CERTIFICATE OF CORRECTION

PATENT NO. : 4,234,468

DATED : November 18, 1980

INVENTOR(S) : Horst Dalibor

It is certified that error appears in the above-identified patent and that said Letters Patent are hereby corrected as shown below:

Title page, Assistant Examiner; "Herbert S. Lilling" should read
-- Herbert J. Lilling --
Col. 1, line 50; "designed" should read -- designated --
Col. 2, line 4; "formations" should read -- formulations --
Col. 2, line 22; "theramplastic" should read -- thermoplastic --
Col. 3, line 6; "conten" should read -- content --
Col. 3, line 36; "he" should read -- the --
Col. 4, line 9; "followed, the" should read -- followed, and the --
Col. 4, line 35; "5.5, %," should read -- 5.5%, --    (delete first comma)
Col. 6, line 56; "mixtuure" should read -- mixture --
Col. 7, lines 57 & 58; "αalkylalkanemonocarboxylic" should read
-- α-alkylalkanemonocarboxylic --
Col. 8, line 6; "reactants" should read -- reactions --
Col. 8, line 27; "1-5%" should read -- 1-1.5% --
Col. 8, line 39; "in preceeding text" should read -- in the preceding text. --
Col. 10, line 2; "emperical" should read -- empirical --
Col. 10, line 16; "atoms" (second occurrence) should read -- atom --
Col. 11, line 23; "perisonononate/dicumyl" should read
-- perisononanate/dicumyl --
Col. 11, line 61; "with" should read -- within --
Col. 13, line 48; "relux" should read -- reflux --

UNITED STATES PATENT AND TRADEMARK OFFICE
CERTIFICATE OF CORRECTION

PATENT NO. : 4,234,468

DATED : November 18, 1980

INVENTOR(S) : Horst Dalibor

It is certified that error appears in the above-identified patent and that said Letters Patent are hereby corrected as shown below:

Col. 14, line 44; "supplied" should read -- applied --
Col. 17, line 17; "is" should read -- in --
Col. 19, lines 48 & 49; "diethtylethanolamine" should read -- diethylethanolamine --
Col. 19, line 56; "180" should read -- 160 --
Col. 22, line 17; "Silkonol" should read -- Silikonöl --
Col. 23, line 29; "alyer" should read -- layer --
Col. 24, line 46; the line above the column headings is left blank (the Table heading) and should read -- Table 1
  Comparison tests on the copolymers --
Cols. 25 & 26, lines 10 & 11, the blank lines between tables 1 & 2; insert before "copolymers" (first occurrence) the heading for the second table which is --      Table 2
  Testing the copolymers according to the invention,
    of Examples 1 and 2, and the comparison --
Cols. 25 & 26, lines 25 & 26, the blank lines between tables 2 & 3; insert before "according" the heading for the third table which is
--      Table 3
  Comparison tests on reactive lacquers composed of
    combinations of the copolymers of Example 1 --

UNITED STATES PATENT AND TRADEMARK OFFICE
CERTIFICATE OF CORRECTION

PATENT NO. : 4,234,468

DATED : November 18, 1980

INVENTOR(S) : Horst Dalibor

It is certified that error appears in the above-identified patent and that said Letters Patent are hereby corrected as shown below:

Col. 27, lines 51 & 52; "and-/or" should read -- and/or -- (hyphenated incorrectly)

Signed and Sealed this

Seventh Day of July 1981

[SEAL]

Attest:

RENE D. TEGTMEYER

Attesting Officer     Acting Commissioner of Patents and Trademarks